United States Patent [19]
Green

[11] Patent Number: 5,522,453
[45] Date of Patent: Jun. 4, 1996

[54] WASHER FLUID HEATER

[76] Inventor: Kenneth E. Green, R. R. #2, Lowbanks, Ontario, Canada, N0A 1K0

[21] Appl. No.: 407,947

[22] Filed: Mar. 22, 1995

[51] Int. Cl.⁶ .................. F28D 7/12; B60H 1/08; B60H 1/06
[52] U.S. Cl. .............. 165/41; 165/76; 165/154; 239/129; 239/130
[58] Field of Search ............ 165/41, 154, 155, 165/156, 76; 239/129, 130

[56] References Cited

U.S. PATENT DOCUMENTS

| | | | |
|---|---|---|---|
| 2,047,757 | 7/1936 | Welsh | 165/154 |
| 2,060,936 | 11/1936 | Haag, Jr. | 165/156 |
| 2,260,904 | 10/1941 | Horton | 20/40.5 |
| 3,292,866 | 12/1966 | Benner | 239/284 |
| 3,391,732 | 7/1968 | Murray | 165/76 |
| 3,632,042 | 1/1972 | Goulish et al. | 239/130 |
| 3,643,733 | 2/1972 | Hall et al. | 165/154 |
| 3,756,510 | 9/1973 | Nitterl et al. | 239/130 |
| 3,802,499 | 4/1974 | Garcea | 165/154 |
| 3,888,412 | 6/1975 | Lindo | 237/12.3 |
| 3,995,332 | 12/1976 | Forchini et al. | 165/900 |
| 4,218,999 | 8/1980 | Shearer | 165/156 |
| 4,354,548 | 10/1982 | Carlsson | 237/12.3 B |
| 4,575,003 | 3/1986 | Linker et al. | 165/41 |
| 4,832,262 | 5/1989 | Robertson | 239/129 |
| 4,862,951 | 9/1989 | Müller et al. | 165/76 |
| 4,895,203 | 1/1990 | McLaren | 165/41 |
| 4,930,568 | 6/1990 | Janezich et al. | 165/76 |
| 5,052,475 | 10/1991 | Grundy | 165/76 |

FOREIGN PATENT DOCUMENTS

| | | | |
|---|---|---|---|
| 411404 | 2/1991 | European Pat. Off. | 165/156 |
| 509691 | 1/1955 | Italy | 165/156 |
| 148394 | 9/1983 | Japan | 165/173 |
| 291894 | 12/1986 | Japan | 165/154 |
| 2043 | 9/1859 | United Kingdom | 165/156 |
| 18560 | 9/1899 | United Kingdom | 165/156 |
| 29777 | 12/1912 | United Kingdom | 165/76 |

*Primary Examiner*—John K. Ford
*Attorney, Agent, or Firm*—Patrick J. Hofbauer

[57] ABSTRACT

The present invention relates to a washer fluid heater for operative connection to a coolant line of the engine cooling system of a vehicle, having a housing formed of a material of low to medium thermal conductivity, which together with end walls positioned in sealing relation thereto, at longitudinally opposite ends thereof, form a washer fluid chamber. Each of the end walls has a central opening of circular cross section. A central heating conduit, formed from a material of high thermal conductivity passes through the washer fluid chamber and through each of the central openings and is adapted for connection into the coolant line of a water cooled automobile engine. A first and a second annular grommets, each formed from a resilient material, are in sealing contact with a respective one of the central openings of the respective end walls. Each grommet has an inner opening dimmensioned to sealingly receive the heating conduit in throughpassing relation. There are additionally provided an inlet and an outlet, each positioned on the housing, adjacent a respective end wall, and in fluid communication with the washer fluid chamber. The inlet and outlet are adapted for connection, respectively, to the washer fluid supply line and the washer spray supply line.

15 Claims, 2 Drawing Sheets

WASHER FLUID HEATER

FIELD OF THE INVENTION

The present invention relates to a device to be used, in a vehicle having a liquid cooled engine, for heating washer fluid before the fluid is applied for cleaning and de-icing vehicular glass surfaces, such as windshields, headlights etc.

BACKGROUND OF THE INVENTION

Various devices are known which utilize heat from the circulating engine coolant of a vehicle in order to raise the temperature of a supply of washer fluid. For example, U.S. Pat. No. 4,862,951, dated Sep. 5, 1989, discloses a windshield washer fluid heating apparatus which includes a cylindrical heater-exchanger housing that, via hose connectors, can be disposed into the coolant line between the engine and radiator, with the interior of the housing, through which the coolant flows, containing a tube coil that is helically wound in the longitudinal direction of the housing. The liquid which is to be heated flows through the tube coil. Similarly, U.S. Pat. No. 4,895,203 discloses a heat exchanger which utilizes waste heat from a motor vehicle engine cooling system to heat a source of water for use with showers and the like in a recreational environment.

Additionally, U.S. Pat. No. 4,354,548 discloses a heat exchanger for automobile washer systems which utilizes a central flow through heat exchanger having a body with approximately the same diameter as the return hose extending between a car engine and its cooling system. Again this device employs the use of conduits wound around one another to accomplish heat exchange. Each of these prior art devices relies upon the use of helically wound heat exchange tubes, and although this configuration provides a large surface area along which heat exchange may occur, the manufacturing costs associated with helical winding may prove prohibitive in most applications.

In U.S. Pat. No. 3,632,042 a windshield cleaning system is disclosed which uses heated engine coolant fluid flowing constantly through a circuit from the heater hose, through a conduit, passing through the windshield washer fluid reservoir in a W-shaped configuration, and then throughout the feed lines to the washer fluid spray nozzles. Although this invention incidently incorporates heat exchange by means of a flow through jacket along the windshield washer supply line, the initial source of fluid heating occurs by means of a bent tube heat exchange device located in the washer fluid reservoir. The costs associated with manufacturing the various system-components are high, and extensive modifications, including the addition of a specialized hot washer fluid pump, make wide-scale retrofitting of this system into existing vehicles impractical.

It is an object of the present invention to provide a washer fluid heater which will function effectively, yet does not require the use of a helical configuration of heat exchange components, since the use of such a helical component significantly increases manufacturing costs.

It is a further object of the present invention to provide a washer fluid heater which is simple and cost effective to assemble from known prefabricated components, and which does not require significant modification of the existing washer fluid supply systems which come as standard equipment on most automobiles.

It is a further object of the present invention to provide washer fluid heater which, through selection of materials and chamber volumes, has a short recovery time, such that even in the repeated use of washer fluid, a further fluid supply is heated for re-use within a short time lapse from the previous activation of the washer fluid spray nozzle.

It is yet a further object of the present invention to provide a washer fluid heater which will withstand the fluid pressure of heated washer fluid without leakage and without stress fractures in the various components due to differential expansion and contraction thereof.

SUMMARY OF THE INVENTION

In accordance with the present invention there is disclosed a washer fluid heater for operative connection to a coolant line of the engine cooling system of a vehicle, said heater comprising a housing, formed of a material of low to medium thermal conductivity, having an inner wall, and defining a longitudinal axis. The device has first and second walls, positioned one each at longitudinally opposite ends of the housing in sealing relation thereto. The first and second end walls define, together with the inner wall of the housing, a washer fluid chamber. Each of the first and second end walls has a central opening of circular cross section. A central heating conduit of substantially circular cross section, and formed of a material of high thermal conductivity, passes through the washer fluid chamber, and through each of the central openings of the end walls in substantially parallel relation to the longitudinal axis thereof. The heating conduit is adapted to provide for connection into the coolant line of the engine cooling system. There are also provided a first and a second annular grommet, each having a circumferential groove positioned on the outer edge thereof, which circumferential groove is in sealing contact with the central opening of a respective one of the first and second end walls. The inner opening of each of the first and second grommet is dimensioned to sealingly receive the heating conduit in throughpassing relation. An inlet means is positioned on the housing, adjacent the second longitudinally opposed end wall of the chamber, and is in fluid communication with the washer fluid chamber. The inlet means is adapted for operative connection into a washer fluid supply line of the vehicle to provide for ingress of washer fluid into the washer fluid chamber. An outlet means is positioned on the housing, adjacent the first longitudinally opposed end wall of the washer fluid chamber, and is in fluid communication with the washer fluid chamber. The outlet means is adapted for operative connection into a spray fluid supply line of the vehicle to provide for egress of washer fluid from the washer fluid chamber towards a vehicular surface to be washed.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described hereinbelow.

DETAILED DESCRIPTION OF A PREFERRED EMBODIMENT

Figure 1:
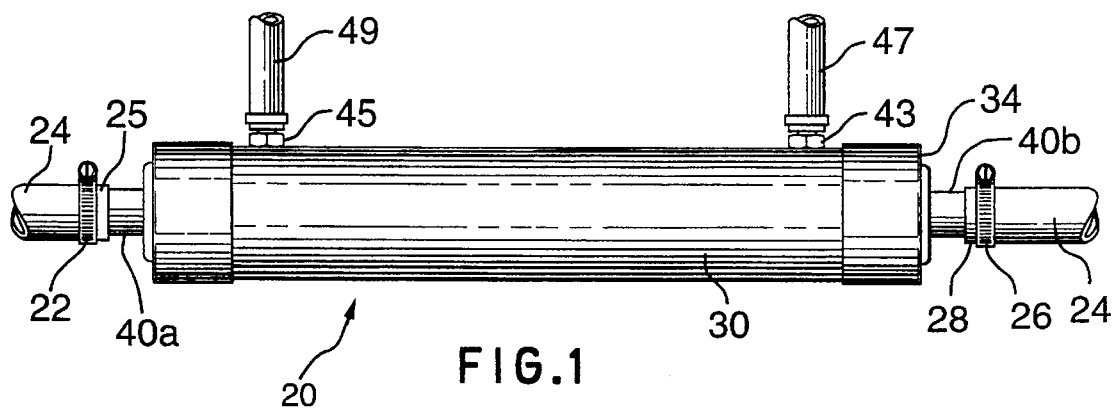
FIG. 1 of the drawings appended hereto is a side elevational view of a preferred embodiment of a washer fluid heater according to the present invention.

Reference will now be made to the drawings, wherein like reference numerals are used in the various Figures to identify analogous structures.

FIG. 1 of the drawings shows a preferred embodiment of a washer fluid heater according to the invention and generally designated by reference numeral 20. The washer fluid heater 20 is designed for operative connection to a coolant line from the engine cooling system of a vehicle, such line preferably being a heater hose 24 extending between the water-cooled engine (not shown) and the heater box (not shown) of a vehicle. The heater hose 24 is cut at the appropriate spot to form two free ends 25 and 28, and the washer fluid heater 20 is connected to the free ends 25, 28. Conventional hose clamps 22 and 26 are used to secure the free ends 25,28 to the washer fluid heater 20 in a manner described more fully below.

Figure 2:
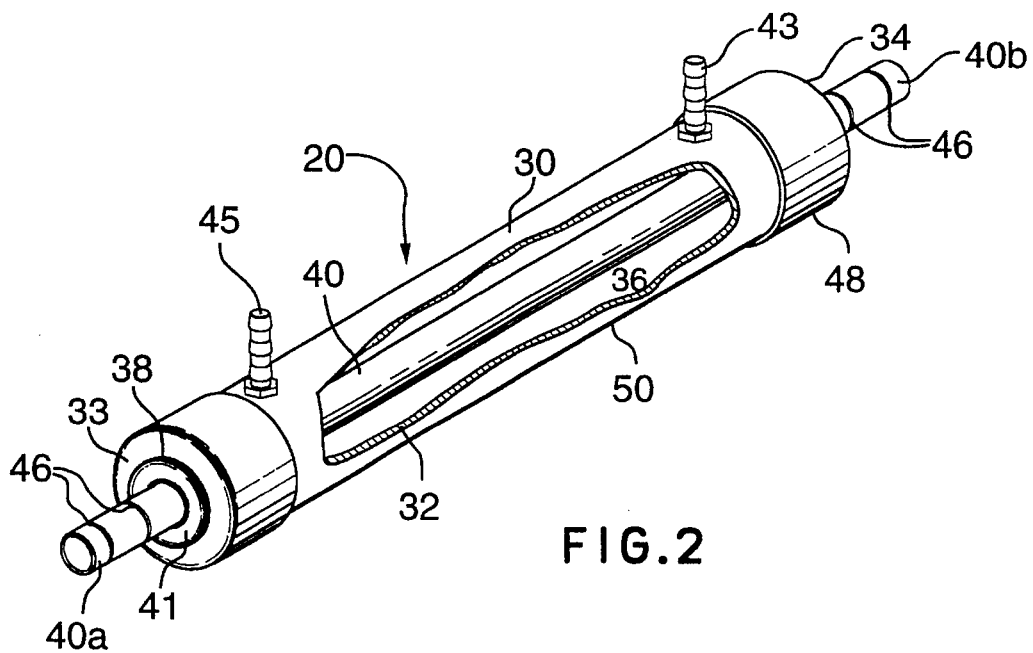
FIG. 2 of the drawings is a perspective view of the washer fluid heater of FIG. 1, having a portion of the housing cut away to show the interior thereof.
Figure 3:
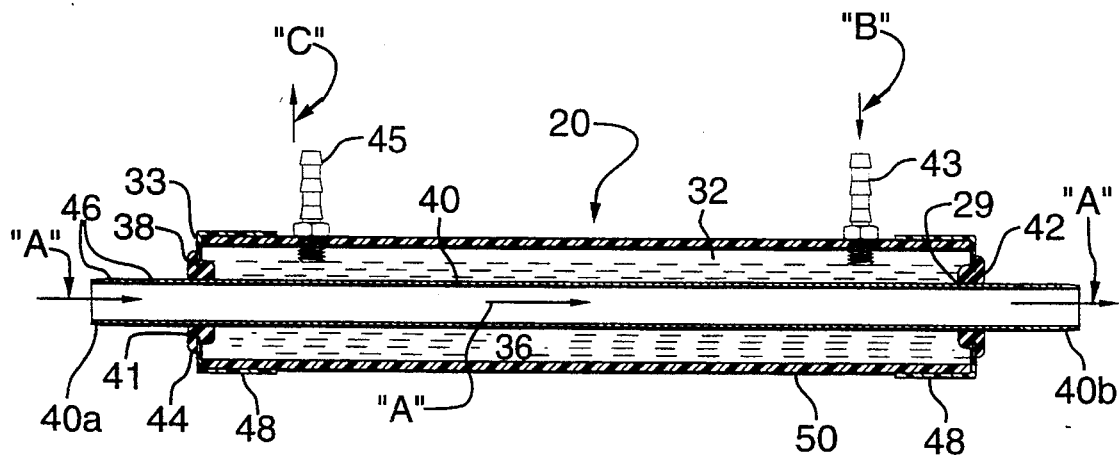
FIG. 3 of the drawings is a longitudinal sectional view of the washer fluid heater of FIG. 1.
Figure 4:
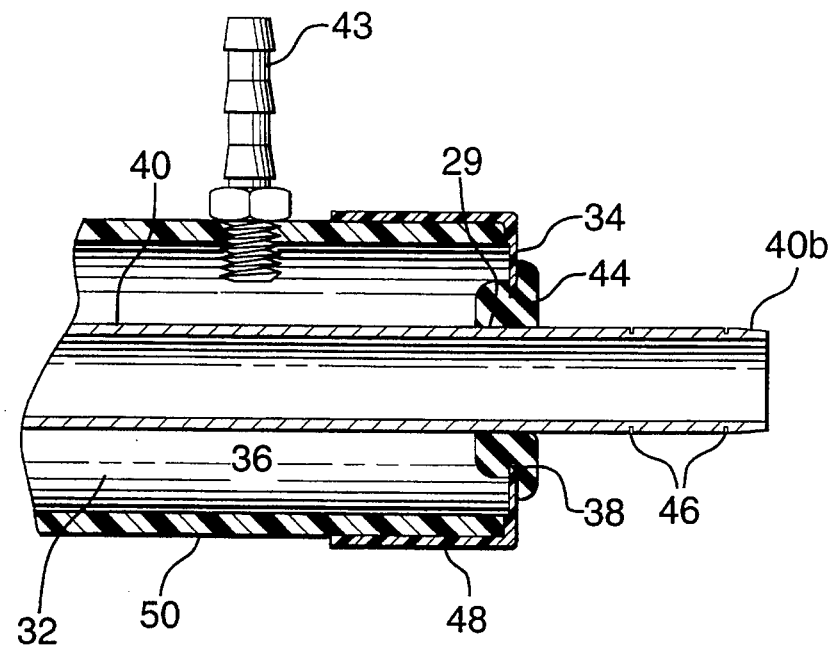
FIG. 4 of the drawings is an enlargement of one end of the longitudinal section of the washer fluid heater of FIG. 3, to show greater detail.

Referring now to FIGS. 2 and 3, the washer fluid heater 20 comprises a housing 30 formed from a material of low to medium thermal conductivity. The housing material should be capable of withstanding a temperature range of about −48° F. to 272° F. Any materials having these characteristics would be acceptable; however, the preferred material is ABS plastic, since this material is, additionally, light weight, readily available, reasonably inexpensive, and can be molded to form the desired shape. The housing 30 defines a longitudinal axis (aligned with arrows "A" of FIG. 2) and has an inner wall 32. There are also provided a first end wall 33 and a second end wall 34, which end walls are positioned one each at longitudinally opposite ends of the housing 30, in sealing relation to the housing 30. Inner wall 32, together with end walls 33 and 34, defines a washer fluid chamber 36. Each of the end walls 33 and 34 has a central opening 38 of circular cross section. In the preferred embodiment, housing 30 is cylindrical in shape. Each of the end walls 33 and 34 further comprises a transversely directed annular sleeve member 48 which is dimensioned to frictionally engaged the outer circumferential surface 50 of housing 30 in sealed relation. The end walls 33 and 34 of the washer fluid heater can be constructed from ABS or PVC; however, in the preferred embodiment shown the end walls 33 and 34 are constructed of polyvinylchloride (PVC) and sealingly engage the outer circumferential surface 50 of housing 30 with the assistance of an adhesive such as a PVC solvent cement. Where ABS plastic is used to construct the end walls 33 and 34, then an ABS solvent cement would be used. This embodiment is preferred because of its low cost and ease of assembly. Also, it is entirely modular in design, such that its linear dimensions can be quickly and easily altered to provide for different vehicular applications.

A central heating conduit 40 of substantially circular cross section and formed of a material of high thermal conductivity, such as copper tubing, passes through washer fluid chamber 36, in substantially parallel relation to the longitudinal axis thereof, and through the central opening 38 in each of the two end walls 33 and 34. First 40a and second 40b end portions of the heating conduit 40 each preferably protrude at least one and one half (1½) inches beyond, respectively, each of first 33 and second 34 end walls of housing 30, and each protruding portion 40a, 40b of heating conduit 40 preferably bears knurling 46 to assist in frictional connection into the free ends 25, 28 of the heater hose 24 by means of hose clamps 22 and 26.

Referring to FIG. 3, a first 41 and a second 42 annular grommet each sealingly engage a respective one of the central openings 38. The grommets 41 and 42 are preferably constructed of a resilient rubberized material, as described more fully below. A circumferential groove 44 is positioned on the outer edge of each of the first 41 and second 42 grommets, and the surface of the central openings 38 of end walls 33 and 34 are seated for sealing in a respective one of circumferential grooves 44. The inner opening 29 of each grommets 41, 42 is dimensioned to sealingly receive the respective end portion 40a, or 40b of the heating conduit 40 in throughpassing relation, to prevent leakage of washer fluid from the washer fluid chamber 36. The housing 30, end walls 33 and 34, heating conduit, and grommet 41 and 42, are ideally constructed to withstand internal fluid pressures, in the washer fluid chamber 36 thereof, of about 30 p.s.i. without leakage of washer fluid from between the central openings 38 and the circumferential grooves 44, and from between the outer surface of the end portions 40a, 40b and the inner opening 29 of the respective grommets. Thus, the grommets 41 and 42 effectively seal the fluid chamber 36 and the heating conduit 40, and stabilize the relative positions thereof. Leakage and stress fractures in the various components due to differential expansion and contraction thereof in the extreme environment typically encountered in the engine compartment of a vehicle, is eliminated by the use of the resilient grommets 41, and 42, which readily accommodate such differential expansion and contraction between the housing 30 constructed of plastic material and the central heating conduit 40 constructed of copper. Each of the grommets 41 and 42 is preferably constructed from a resilient material which is not subject to chemical degradation caused by contact with heated washer fluid, which washer fluid typically contains a high percentage of ethanol or methanol. One such material, which is the preferred material for construction of the grommets 41, 42 is styrene-butadiene rubber.

An inlet means 43 is located on the housing 30, adjacent the second end wall 34, and is in fluid communication with washer fluid chamber 36. The inlet means 43 is adapted for operative connection into the washer fluid supply line 47 (see FIG. 1), and provides for ingress of washer fluid, in the direction of arrow "B", from a reservoir (not shown) and/or a washer fluid pump (not shown), into the washer fluid chamber 36. In the preferred embodiment, the inlet means 43 is a barbed metal spigot, which is connected into the housing 30 by means of conventional screw threading. An outlet means 45 is located on housing 30, adjacent the first end wall 33, and is in fluid communication with the washer fluid chamber 36. The outlet means 45 is adapted for operative connection into a washer spray supply line 49 (see FIG. 1), and in this manner provides for egress of heated washer fluid in the direction of arrow "C" from the washer fluid chamber 36. In the preferred embodiment, the outlet means 45 is a barbed metal spigot, which is connected into the housing 30 by means of conventional screw threading. The heated washer fluid is thereafter directed by the washer spray supply line 49 to the spray nozzle(s) (not shown) of the vehicle provided adjacent the windshield or other vehicular surface (not shown) to be washed.

The size differential between the washer fluid chamber 36 and the heating conduit 40 will significantly impact upon the performance of washer fluid heater 20. A heating conduit constructed from copper pipe having a ½ inch inner diameter and ⅝ inch outer diameter is preferred, as a pipe having these specifications will fit into the heater hoses of approximately 90% of currently existing North American vehicles, without further modification. A linear length of ⅝ outer diameter copper pipe of approximately 10 inches, within washer fluid heater 20, provides a heating conduit with a surface area of approximately 20 square inches in contact with the washer fluid. If the washer fluid chamber 36 has a volume excessively larger than the heating conduit 40, then a pressure drop will be created across the inlet means 43 and the outlet means 45, with the result that the conventional washer fluid pump supplied with most vehicles will be unable to move a sufficient volume of fluid to maintain acceptable levels of operating pressure in the system. A fluid chamber 36 of insufficient volume will result in an inadequate supply of heated washer fluid to accomplish cleaning and/or de-icing. The preferred volume for a washer fluid chamber 36 is approximately 12 fluid ounces, and can be obtained using a ⅝ inch outer diameter heating conduit 40, and an ABS plastic housing of approximately 1¼ inches inner diameter, both components of approximately 10 inches linear length. A washer fluid heater constructed to these specifications will provide an adequate supply of heated washer fluid for most vehicles, with a recovery time of approximately 60 seconds for a vehicle having an operating temperature of 165° F., and a recovery time of 35 seconds for a vehicle having an operating temperature of 195° F. Optimal heat exchange efficiency is obtained when the central heating conduit 40 is adapted for operative connection into the cooling system of a vehicle with a hot water flow direction through the heating conduit 40, substantially parallel to the housing 30, in a direction opposite to that of the flow of washer fluid, which enters fluid chamber 36 via inlet means 43 and exits the fluid chamber 36 via outlet means 45, as shown by the directional arrows "A","B" and "C" in FIG. 3.

In use, the heating conduit 40 is connected into the cooling fluid circuit of a motor vehicle. In order to effect connection, the heater hose 24 is cut and each of the free ends 25, 28 thereof is connected, by means of conventional hose clamps 22 and 26, to a respective protruding end 40a, 40b of the heating conduit 40. The washer fluid supply line 47 is then frictionally connected to inlet means 43, and the spray supply line 49 is frictionally connected to outlet means 45. When the vehicle engine is started, engine coolant will circulate through the heating conduit 40. Washer fluid will be pumped into the washer fluid chamber 36, in contact with heating conduit 40. A supply of washer fluid is, thus, heated and stored in washer fluid chamber 36, and is available to clean vehicular glass surfaces when the vehicle washer spray switch is activated. When the vehicle washer system is thus activated, hot washer fluid leaves washer fluid chamber 36 via outlet means 45, travels through spray supply line 49, and is applied to the vehicular glass surface to be cleaned or de-iced. As the washer fluid pump maintains pressure in the washer fluid supply system, additional washer fluid travels from the reservoir, through washer fluid supply line 47 and enters washer fluid chamber 36, through inlet means 43 to be heated and stored for further use as required.

Figure 5:
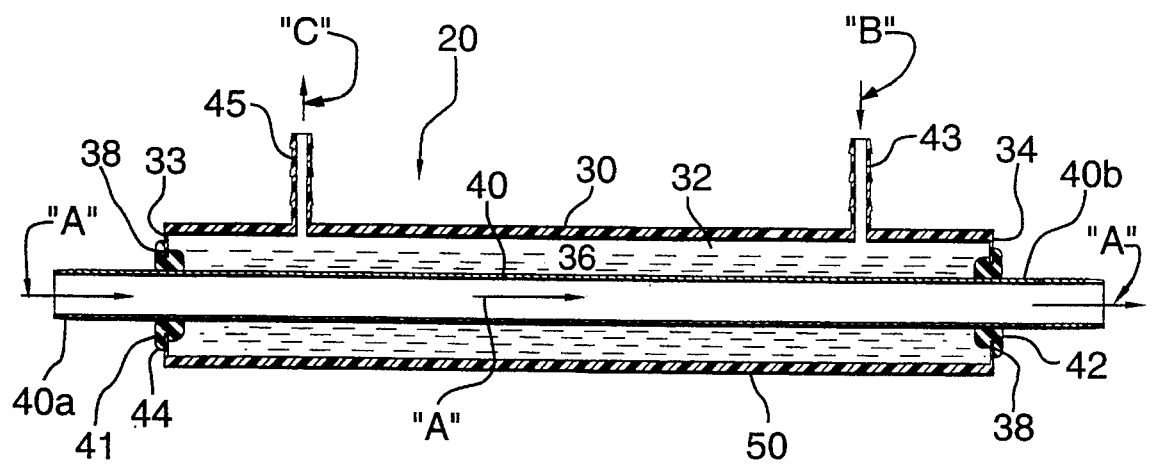
FIG. 5 of the drawings is a longitudinal section of an alternate embodiment of the washer fluid heater according to the present invention, wherein the all parts of the heater, exclusive of the heating conduit and the grommet are integrally molded.

In a further embodiment, shown in FIG. 5, housing 30, the first 33 and second 34 end walls, the inlet means 43, and the outlet means 45 are integrally molded in a unitary manner of ABS plastic. The remaining elements are constructed of the same materials and assembled in substantially the same manner as with the preferred embodiment of FIGS. 1–3, and function in an essentially analogous manner.

It will be appreciated that the above description addresses only two embodiments of the invention, and that many non-inventive, routine modifications are possible. Thus, the invention is limited only by the scope of the appended claims.

I claim:

1. A washer fluid heater for operative connection to a heater hose of a vehicle, said heater comprising:

a cylindrical housing, formed of a material of low to medium thermal conductivity, having an inner wall, and defining a longitudinal axis;

first and second end walls, positioned one each at longitudinally opposite ends of the housing in sealing relation to said housing, thereby to define, together with the inner wall of said housing, a non-helical washer fluid chamber, each of said first and second end walls having a central opening of circular cross section;

a central heating conduit of substantially circular cross section, and formed of a material of high thermal conductivity, said conduit passing through said washer fluid chamber and through each of said central openings of said end walls in substantially parallel relation to said longitudinal axis thereof and adapted to provide for connection into said heater hose so as to direct a hot water flow through said central heating conduit in substantially parallel relation to said longitudinal axis in a direction to pass first through said first end wall and thence through said second end wall;

first and second annular grommets each having a circumferential groove positioned on the outer edge of each of said first and second annular grommets, said circumferential groove being in sealing contact with the central opening of a respective one of said first and second end walls, the inner opening of each said first and second grommets being dimensioned to sealingly receive said heating conduit in said throughpassing relation;

an inlet means, positioned on the housing adjacent said second longitudinally opposed end wall of said chamber, in fluid communication with said washer fluid chamber, said inlet being adapted for operative connection into a washer fluid supply line of said vehicle to provide for ingress of said washer fluid into said washer fluid chamber: and, an outlet means positioned on the housing adjacent said first longitudinally opposed end wall of said chamber in fluid communication with said washer fluid chamber, said outlet means being adapted for operative connection into a washer spray supply line of said vehicle to provide for egress of said washer fluid from said washer fluid chamber.

2. A washer fluid heater according to claim 1, wherein said first and second grommets are composed of a resilient material.

3. A washer fluid heater according to claim 2, wherein said first and second grommets are constructed from a rubber material.

4. A washer fluid heater according to claim 3, wherein said first and second grommets are constructed from styrene-butadiene rubber.

5. A washer fluid heater according to claim 1, wherein said housing, end walls, heating conduit, and grommets, in combination, form a washer fluid heater which is adapted to withstand internal fluid pressures of 30 p.s.i. without leakage of washer fluid.

6. A washer fluid heater according to claim 1, wherein each end portion of said heating conduit protrudes from and extends at least 1½ inches beyond each said chamber end wall.

7. A washer fluid heater according to claim 6, wherein said coolant line includes at least one heater hose, and wherein the protruding portions of said heating conduit are each knurled to enhance their frictional retention upon connection into respective free ends cut into said heater hose.

8. A washer fluid heater according to claim 1, wherein said windshield washer fluid chamber has an interior volume of 12 fluid ounces and said heating conduit provides a surface area of approximately 20 square inches in contact with said windshield washer fluid.

9. A washer fluid heater according to claim 1, wherein said housing is composed of a material able to withstand a temperature range about −48° F. to 272° F.

10. A washer fluid heater according to claim 9, wherein said outer housing is composed of ABS plastic.

11. A washer fluid heater according to claim 1, wherein said first and second end walls further comprise a transversely directed annular sleeve member dimensioned to frictionally engage the outer circumferential surface of said respective end of said housing in sealed relation.

12. A washer fluid heater according to claim 11, wherein each of said end walls sealingly engages the outer circumferential surface of said respective end of said housing with the assistance of an adhesive material.

13. A washer fluid heater according to claim 12, wherein each of said first and second end walls are constructed from polyvinylchloride (PVC).

14. A washer fluid heater according to claim 13, wherein said adhesive material is a PVC solvent cement.

15. A washer fluid heater according to claim 1, wherein said housing, said end walls, said inlet means, and said outlet means are integrally molded of ABS plastic.

* * * * *